United States Patent [19]
Steele et al.

[11] Patent Number: 6,090,465
[45] Date of Patent: *Jul. 18, 2000

[54] REINFORCED COMPOSITE STRUCTURE

[75] Inventors: Robin S. Steele, Centerville; Jennifer L. Stenger, Lebanon, both of Ohio

[73] Assignee: Spectrum Solutions, Ltd., Lebanon, Ohio

[*] Notice: This patent issued on a continued prosecution application filed under 37 CFR 1.53(d), and is subject to the twenty year patent term provisions of 35 U.S.C. 154(a)(2).

[21] Appl. No.: 08/895,154

[22] Filed: Jul. 15, 1997

Related U.S. Application Data

[63] Continuation-in-part of application No. 08/568,197, Dec. 6, 1995, Pat. No. 5,647,503, which is a continuation-in-part of application No. 08/297,232, Aug. 29, 1994, abandoned.

[51] Int. Cl.⁷ .............................. B32B 3/06; B29C 45/00
[52] U.S. Cl. ..................... 428/102; 428/119; 428/120; 28/140; 28/143; 264/512
[58] Field of Search .................... 428/102, 119, 428/120; 28/140, 143; 264/512

[56] References Cited

U.S. PATENT DOCUMENTS

| | | |
|---|---|---|
| 517,777 | 4/1894 | Timmis . |
| 1,743,459 | 1/1930 | Kjekstad . |
| 2,156,400 | 5/1939 | Pechstein . |
| 2,296,414 | 9/1942 | Albrecht . |
| 3,368,708 | 2/1968 | Pflederer . |
| 3,680,727 | 8/1972 | Pearson . |
| 4,609,449 | 9/1986 | Morin . |
| 4,925,044 | 5/1990 | Hembert . |
| 4,974,743 | 12/1990 | Sasaki et al. . |
| 5,102,723 | 4/1992 | Pepin .................................. 428/223 |
| 5,112,665 | 5/1992 | Alexander ........................... 428/102 |
| 5,177,919 | 1/1993 | Dykmans . |
| 5,194,212 | 3/1993 | Bonnett . |
| 5,269,436 | 12/1993 | Bachmann . |
| 5,346,566 | 9/1994 | White .................................... 156/71 |
| 5,387,455 | 2/1995 | Horsch . |
| 5,462,193 | 10/1995 | Schoo . |
| 5,647,503 | 7/1997 | Steele et al. . |

FOREIGN PATENT DOCUMENTS

| | | |
|---|---|---|
| 0673040 | 1/1930 | France . |
| 2642725 | 4/1977 | Germany . |
| 2931947 | 2/1981 | Germany . |
| 3633333 | 4/1988 | Germany . |
| 3821852 | 2/1990 | Germany . |
| WO 96/06750 | 3/1996 | WIPO . |

*Primary Examiner*—Christopher Raimund
*Attorney, Agent, or Firm*—Wood, Herron & Evans, L.L.P.

[57] ABSTRACT

A reinforced composite structure (29) is disclosed. The structure is formed by opposed layers of material extending over a core and continuous bundles stitched in a repeating pattern through the opposed layers (30, 32) and the intermediate core (28) to form the reinforced composite structural member (29).

16 Claims, 3 Drawing Sheets

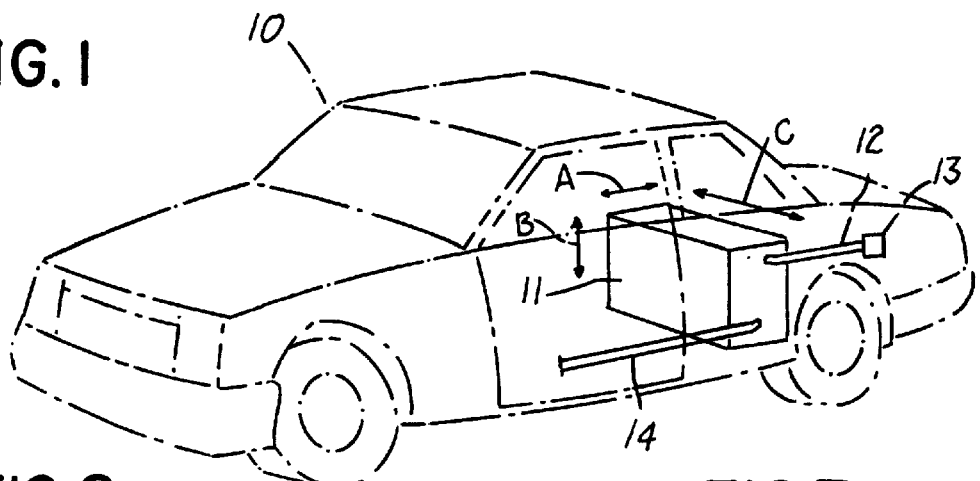
FIG. 1
FIG. 2
FIG. 7
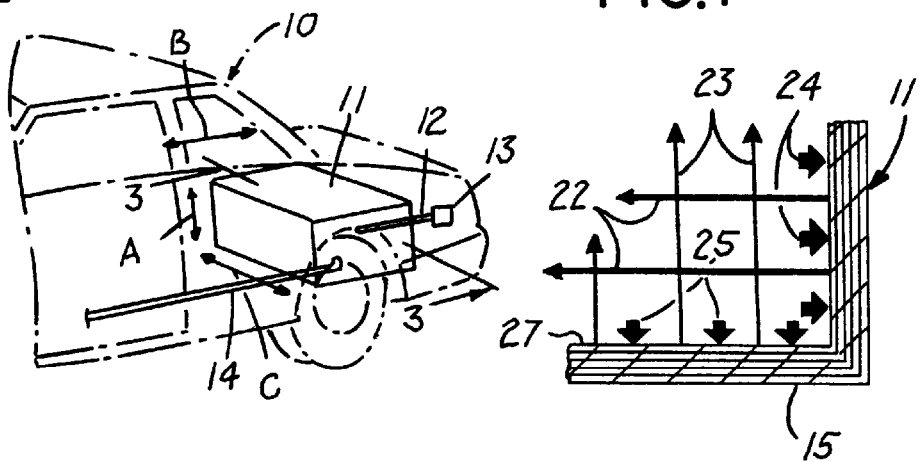
FIG. 3
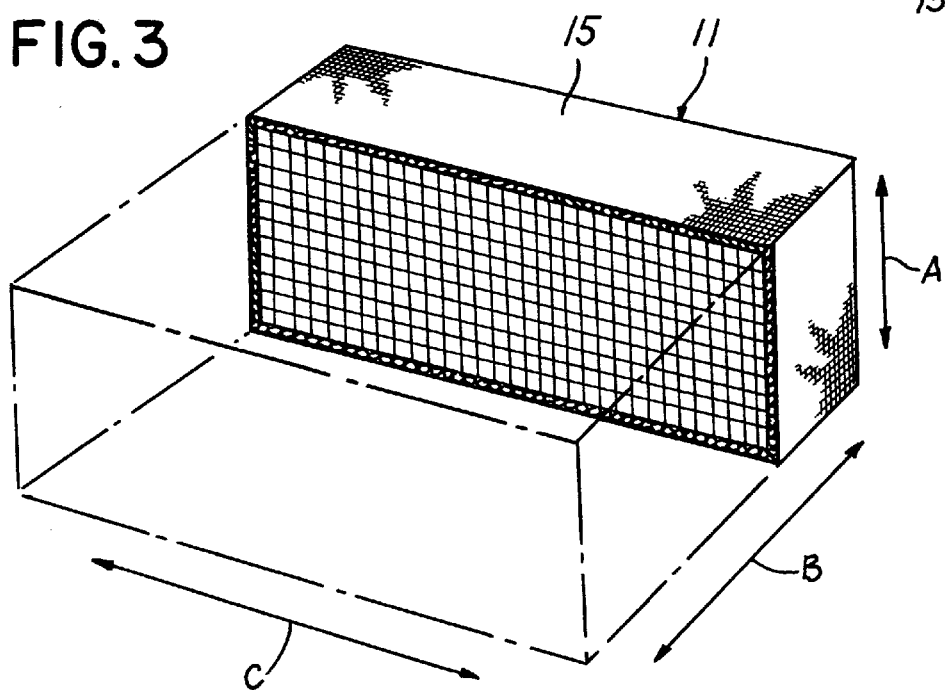

REINFORCED COMPOSITE STRUCTURE

This is a continuation-in-part of application Ser. No. 08/568,197 filed on Dec. 6, 1995 and entitled TANK FOR STORING PRESSURIZED GAS, now U.S. Pat. No. 5,647, 503, which is a continuation-in-part of application Ser. No. 08/297,232 filed Aug. 29, 1994 and entitled NON-CYLINDRICAL FUEL TANKS FOR NATURAL GAS VEHICLES, now abandoned.

FIELD OF THE INVENTION

The present invention relates generally to the construction of reinforced composite structures, and more particularly, to a composite sandwich structure member.

BACKGROUND OF THE INVENTION

For many years, there has been interest in developing and using alternative fuels for vehicles, and particularly, overland vehicles, for example, automobiles, buses, trucks, etc. Over that period of time, many such vehicles have been retrofitted to operate using natural gas. More recently, with increasingly stringent air pollution standards, fleets of vehicles that have been retrofitted to operate with natural gas are more common.

In currently retrofitted vehicles, the natural gas is often stored in a cylindrically shaped pressurized metal vessel, such as, a steel or aluminum tank, designed specifically for storing gases such as natural gas, propane, nitrogen, etc. under high pressure. The cylindrical shape of the tank provides a circular cross section about an axis which eliminates bending stresses and helps reduce the weight of the tank. Since the cylindrical steel natural gas storage tank is not suitable for and cannot be readily retrofitted in place of the vehicle's liquid fuel storage tank, the natural gas storage tank is often housed in the storage area or trunk of the vehicle, thereby eliminating or severely limiting the use of the trunk for other storage. Therefore, there is a need for a natural gas storage tank that can take the place of the vehicle's liquid fuel storage tank. Other gas storage tank designs and structures are known in the art.

For example, the Pechstein U.S. Pat. No. 2,156,400 is directed to a spherical container for storing fluids such as gases and liquids. The spherical container has a foundation with at least three reinforcing supports adapted to transmit the forces exerted by the dead weight and the weight of the contents of the container upon the foundation. The container further includes lower struts connected at their ends to points on the inner wall of the container where the container rests on the supports to form at least one lower polygonal frame. The container further has upper struts connected at both ends to the inner wall of the container at points lying in its horizontal middle portion to form at least one upper polygonal frame. Inclined struts connect the corner points of the upper and lower polygonal frames to provide a self supporting framework which is adapted to transfer the loads due to the dead weight and the weight of the contents of the container directly upon the supports without substantially stressing the walls of the container.

The Albrecht U.S. Pat. No. 2,296,414 is directed to heavily reinforced storage tanks for liquids and gases that are present in high volume and have angular sides made of flat or curved plates. The storage tank has flat side, top and bottom walls of metal plates. A plurality of vertically spaced tiers of braces are set at angles to adjacent vertical walls. Each tier has a plurality of parallel, horizontal, equally spaced braces lying in a common plane. Each of the braces forms a triangular truss with adjacent vertical walls to cause the stresses in the bracing members and the wall plates to be compensating stresses.

The Pflederer U.S. Pat. No. 3,368,708 is directed to a filament wound storage vessel capable of withstanding high internal pressures. The cylindrical wall of the tank is formed of helically wound, fibrous material impregnated with thermal setting resin serving to bond fibers together as an integral structure.

While all of the above known tanks are effective to confine a gas under high pressure, the designs of the tanks are directed to their particular application. For example, the design of the currently used steel cylindrical tank is directed to a tank that is intended to be portable and not permanently affixed to any particular structure. Therefore, the tank has specifications relating to its size, shape and weight that facilitate portability.

In contrast, the Pechstein '400 and Albrecht '414 patents are designed to store large volumes of pressurized gas and are not designed for portability. The Pflederer '708 patent is designed to have a removable head portion at one end which presents different design considerations and a different structure. None of the above tanks provide a tank structure that may be constructed in any desired shape as may be required for installation in a vehicle. Further, Applicants are not aware of any of those pressurized tank structures serving any purpose other than holding a pressurized liquid or gas.

SUMMARY OF THE INVENTION

The present invention provides a natural gas storage tank designed specifically for installation in motor vehicles. Further, the natural gas storage tank of the present invention has the capability of being constructed to any desired shape to fit the specifications and space limitations for installation in a motor vehicle. Further, it has been found that an intermediate structure created in the process of fabricating the tank may be used as a composite sandwich structure.

More particularly, and in accordance with the principles of one embodiment of the present invention, a fuel tank for a vehicle powered by natural gas includes a three dimensional tank outer wall structure made of a fibrous composite material. The tank outer wall structure has an exterior surface and further has at least two walls bounding an interior. The fuel tank further includes a set of continuous, fibrous bundles, for example, unidirectional, braided, twisted or monofilament fibers, extending in a repeating pattern over the exterior surface of the outer wall structure on the first wall, through the first wall, through the interior, through the second wall, and over the exterior surface of the outer wall structure on the second wall.

In another aspect of the invention, the first and second walls of the tank may be parallel or may be adjacent, intersecting walls. In another aspect of the invention, the tank includes a second set of continuous, fibrous bundles extending in a repetitive pattern over the exterior surface of the wall structure on a third wall of the tank, through the third wall, through the interior, through a fourth wall of the tank and over the exterior of the fourth wall.

In still another aspect of the invention, the tank includes a third set of continuous, fibrous bundles extending in a similar repeating pattern over and through fifth and sixth walls of the tank. The first, second and third bundles of continuous fibers may extend through the interior of the tank in directions generally perpendicular to each other, or, in directions that are oblique to each other, or, in perpendicular and oblique combinations thereof. Therefore, advantageously, the walls of the tank may be adjacent.

The pressurized natural gas tank construction of the present invention has the advantage of being light in weight and capable of confining the pressurized gas. The construction permits the tank to be made in any geometric shape and, preferably, in a noncylindrical, prismatic shape comprised of a number of intersecting generally flat faces or surfaces. Therefore, the walls of the tank can conform to any available space in a vehicle for a tank.

In accordance with another embodiment of the invention, a reinforced composite sandwich structure includes opposed first and second layers that extend over opposite sides of a core. A set of continuous, fibrous bundles extend in a repeating pattern over an exterior surface of the first layer, through the first layer, through the core, through the second layer and over an exterior surface of the second layer. Such a structure has a wide range of applications and the desired properties of being very stiff and light weight. These and other objects and advantages of the present invention will become more readily apparent during the following detailed description together with the drawings herein.

BRIEF DESCRIPTION OF THE DRAWINGS

FIG. 1 is a perspective view of a vehicle shown in phantom line and containing a the natural gas tank in accordance with the principles of the invention.

FIG. 2 is a fragmentary perspective view of the vehicle with the natural gas tank of the present invention mounted in a different orientation within the vehicle.

FIG. 3 is a perspective view of the tank of FIG. 2 with parts phantom and parts in cross-section taken generally along the line 3—3 of FIG. 2.

FIG. 7 is a diagrammatic view illustrating the force vectors which operate on the tank internally due to the pressures exerted by the natural gas under high pressure.

DETAILED DESCRIPTION OF THE INVENTION

Figure 4:
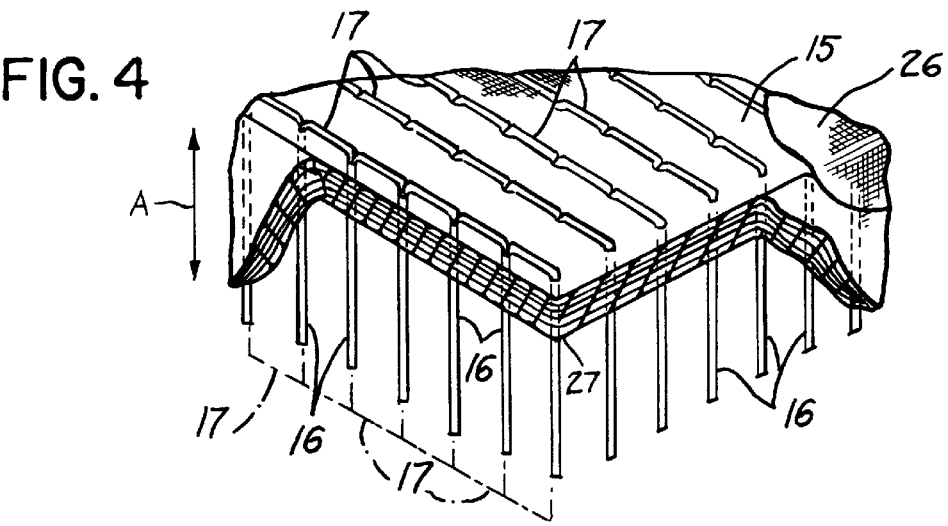
FIG. 4 is a fragmentary perspective view of a portion of the tank of the present invention with parts in cross-section illustrating an arrangement of fibers constituting a first fibrous network.

As will be apparent from FIGS. 1 and 2, the vehicle 10 contains high pressure tank gas tank 11 which, as shown, is located in the rear of the vehicle. In FIG. 1, the tank is oriented with its B axis in a vertical direction, and its longitudinal C axis substantially perpendicular to the length of the vehicle. In FIG. 2, the tank has been rotated about its longitudinal C axis so that its B axis in a horizontal direction. Attached to tank 11 is fill hose line 12 which is capable of handling the gaseous fuel under high pressure and engine fuel supply line 14 which is also capable of handling the gaseous fuel under pressure. Pressure can be reduced at the tank fitting by use of a pressure regulator. Located to the rear of high pressure tank 11 and connected to fill hose 12 is a receptacle 13 for adding additional natural gas or other fuel.

As will be apparent from FIGS. 3—8, the outer structural wall portion of high pressure tank 11 is comprised of a material 15 which may be a fibrous composite layered material, for example, a prepreg material, a filament wound toe, unidirectional or woven fabric which in turn, can be a fibrous mat, braided fabric or knitted fabric. The material 15 may be made from unidirectionally or randomly oriented fibers.

As is noted from FIGS. 3, 4, 5, 6 and 8, continuous, internal, fibrous bundles 16, also referred to as "internal fibers", are arranged within tank 11 along the A axis as illustrated in the drawings. The fibrous bundles 16 can consist of monofilament line, wire or fiber that can be unidirectional, braided or twisted. More specifically, the fibers can be bundles of glass, quartz, graphite, organic and/or metallic fibers which are joined together. Organic fibers that may be used include without limitation aramid, nylon, polyethylene, and next generation organic fibers. Metallic fibers include without limitation steel and aluminum. The bundles of fibers may include either a single fiber or any combination of fibers. The fibrous composite layers 15 and bundles 16 may be coagulated together using a matrix material, which in turn can be a thermoset or thermoplastic resin or a metal matrix.

Exposed portions 17 of fibrous bundles 16 are crossed over or stitched through the fibrous composite layered material 15 as shown in FIGS. 4, 5, 6 and 8, and can be covered with a protective layer or coating 26. The protective layer or coating 26 can be, for example, a coating or protective film such as rubber, urethane, vinyl, etc., or a thermoset or thermoplastic resin, a metal and/or a composite fibrous overlap.

Figure 6:
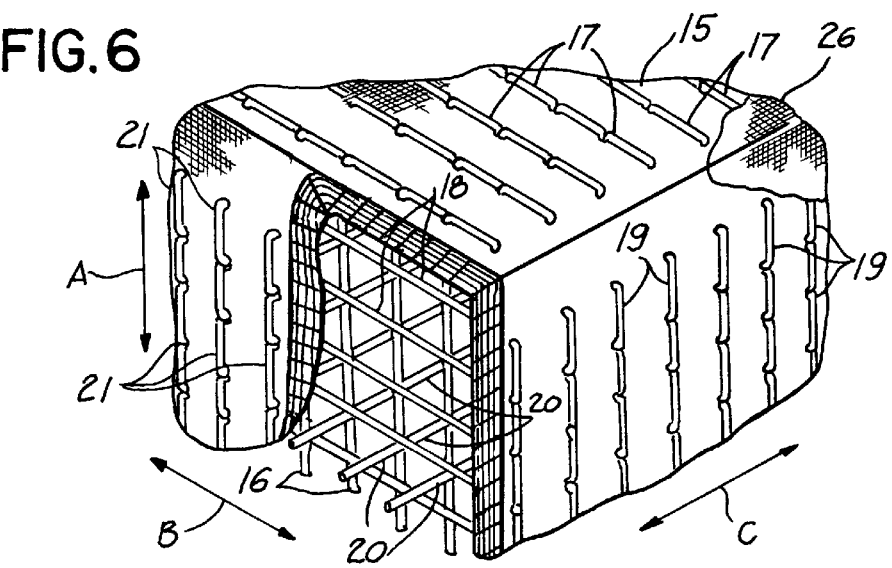
FIG. 6 is a fragmentary perspective view similar to those of FIGS. 4 and 5 illustrating a three-dimensional fibrous network.

The continuous, fibrous bundles 16 arranged along the A axis serve to provide reinforcement substantially perpendicular to that of reinforcing fibrous bundles 18 and 20 shown in FIG. 6. The reinforcing fibrous bundles 16 pass through the multi-ply tank wall then exposed 17 along the exterior surface of the outer structural wall and then re-enter the tank through the wall. This pattern is repeated seriatim to provide the internal reinforcement mainly along the A axis resisting the internal pressure forces, which would otherwise tend to warp the tank away from its desired three-dimensional, noncylindrical structural configuration. The thickness of the wall 15 and the spacing of fibrous bundles 16 and 17 can be varied as desired. Protective covering 26 can be a composite fibrous overwrap or layer or it can be a resinous coating. A liner 27 can be used on the interior surface to meet the permeation requirements for specific applications. The liner 27 may be a urethane, silicon, isocyanate, or "TEFLON" material.

Figure 5:
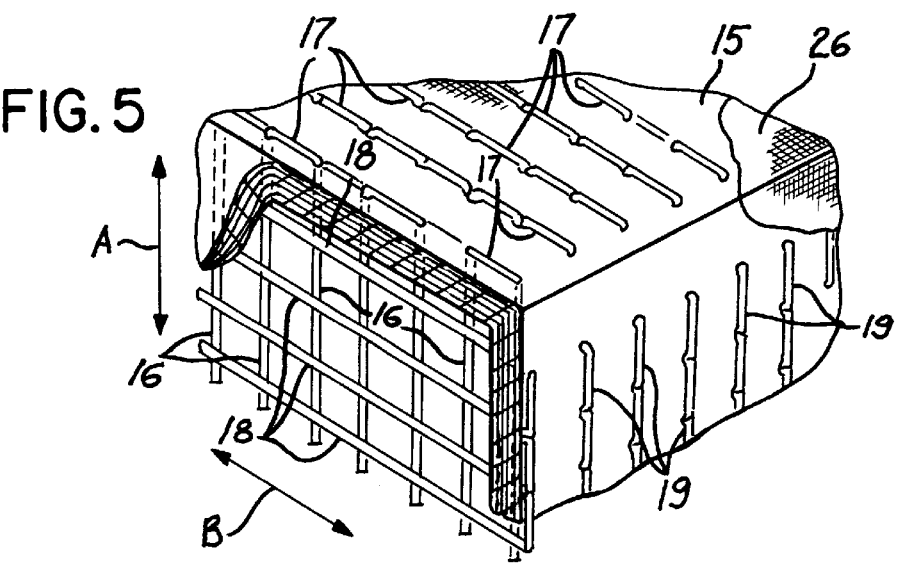
FIG. 5 is a fragmentary perspective view, similar to that of FIG. 4, with parts in cross-section illustrating two fibrous networks.

Continuous, fibrous bundles 18 are arranged mainly along the B axis as is shown in FIGS. 3, 5 and 6 and are crossed over/stitched through the walls 15 and emanate along the outer structural wall as 19.

As shown from FIG. 6, disposed along the C axis are reinforcing continuous, fibrous bundles 20 whose exposed ends 21 emanate from the interior of tank 11. These bundles pass through the multi-plies of the outer structural wall and are exposed on the exterior surface of the outer structural wall. The bundles then re-enter into the interior of tank 11 to serve as a lateral reinforcement, tying the multi-ply walls together so as to reinforce tank 11 from forces which would otherwise tend to push the tank out on all walls. The tanks of this invention are characterized as having a noncylindrical three-dimensional tank outer wall having an exterior surface and substantially opposed wall portions of fibrous composite wall material and reinforcing portions. These reinforcing portions are in the form of a first set of continuous, fibrous bundles which traverse through the tank outer wall, and a second set of continuous, fibrous bundles running in a direction substantially perpendicular to the first set and, also passing through the tank outer wall. The first set and the second set of fibrous bundles exit and re-enter the tank outer wall to provide exposed portions on the exterior surfaces thereof. A protective layer covers the exterior surface of the tank outer wall and these exposed portions of the fibrous bundles.

As will be apparent from FIG. 7, the vector forces operating internally on the noncylindrical tank walls, which are of a multi-layered construction shown at 11, 15, exert substantially perpendicularly opposed forces. Forces from the fibrous bundles shown as 22, 23 balance the gas pressure forces shown as 24, 25. As will be appreciated, for tanks of complex shapes, the forces shown as 22, 23 will not necessarily be perpendicular. As will be apparent from FIG. 7, the respective pairs of forces 22, 24 and 23, 25 are in parallel but opposite directions.

Figure 8:
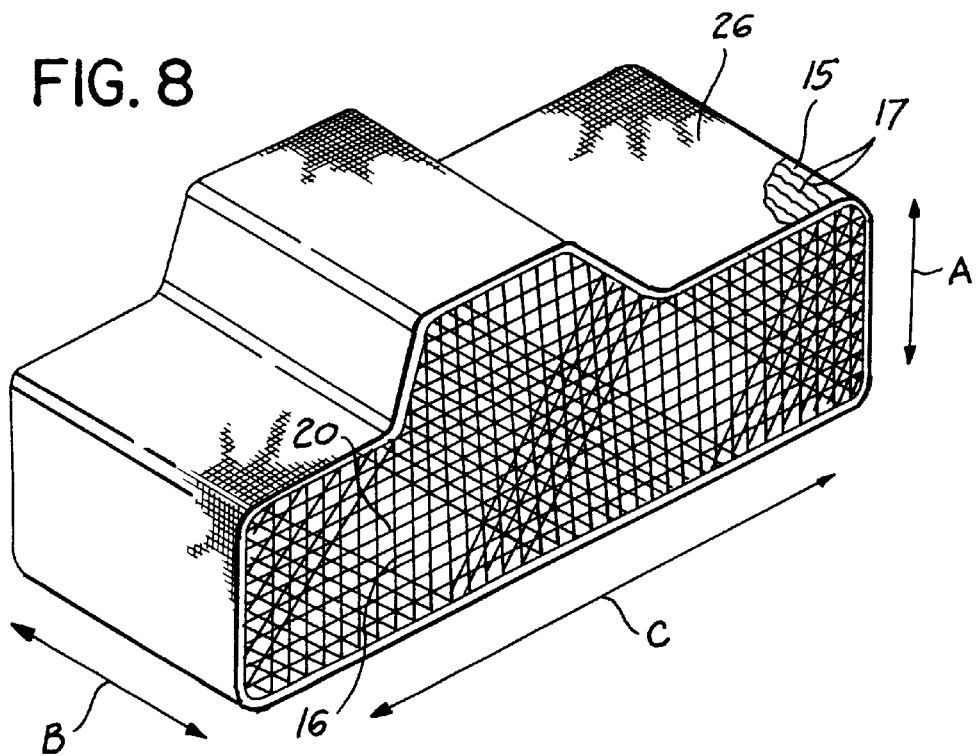
FIG. 8 is a fragmentary, cross-sectional, perspective view of a portion of an embodiment of this invention illustrating the support of oblique walls and the use of obliquely oriented fibrous networks.

The reinforcing fibrous bundles are depicted two dimensionally in axes A and C in FIG. 8. One or more additional sets of reinforcing fibrous bundles can be located so as to be at reinforcing positions other than substantially perpendicular with respect to substantially opposed outer structural wall portions. The fibrous reinforcing bundles can be placed at angles other than 90° to maintain complex shapes and/or to minimize the number and length of the internal reinforced fibrous bundles, therefore maximizing tank volume. Fibrous bundles which are not substantially perpendicular to a wall surface are designed to balance the forces such that the desired tank shape is maintained.

Such geometrically complex non-cylindrical fuel tanks in accordance with this invention are characterized by a structure having fiber bundles oriented in a crossing substantially perpendicularly intersecting pattern in combination with fiber bundles which are arranged at angles other than substantially ninety degrees compared with the substantially perpendicular fiber bundles. Such structure is illustrated in FIG. 8 and contains a complex geometric configuration having multiple plateaus connected by sloping spans and further characterized by rounded or sharply rounded edge surfaces.

In a lesser complex aspect, as shown in FIGS. 3, 5 and 6, the reinforcing structure illustrated involves plies of unidirectional tape or woven fabric having a crossing 90° intersecting pattern involving substantially perpendicular internal reinforcement. Thus the nature of the internal reinforcement and external reinforcement provided by these bundles and woven or non-woven fabric containing them can be varied in accordance with the present invention depending upon the specific pressure loads and the exterior wall engineering configuration of the tanks 11.

Fabrication

The tanks of the present invention can be made by a variety of procedures, including, but not necessarily limited to, procedures wherein the exterior tank wall is laid up, and in an enveloping fashion, covers a temporary or fugitive core through which the internal fibers are then stitched, or three dimensionally braided over a mandrel in which case a fugitive core is not needed.

The internal fibers or bundles of fibers as previously defined may be joined together by a thermoset or a thermoplastic resinous matrix material, or other matrix material. The metal fibers may joined by a brazing or soldering matrix material that is heated with the metal fibers at a temperature and for a time so that the metal fibers are joined with the matrix material but do not become annealed. The matrix material is capable of withstanding the solvents employed to remove the foam or other temporary, viz., fugitive, core on the one hand or is capable of withstanding the temperatures at which the foam or other temporary core material is pyrolyzed once the internal and external substantially perpendicular and non-perpendicular reinforcing fibers have been placed and solidified at their desired locations. Woven plies of pre-impregnated material stitched with pre-impregnated bundles of fibers can be formed by inflation followed by curing within assembled sections of a mold. Upon cooling or curing, the tank 11 achieves its solid, non-cylindrical, three-dimensional desired configuration.

The liner material 27 may be added by two methods. The first method involves placing the liner material, for example, a urethane, silicon, isocyanate, or "TEFLON" material, over the preform and under the fibrous composite material that forms the tank walls. The entire assembly is then stitched with a set of fibrous bundles and then heat and/or pressure is applied to fuse the liner material to the assembly. The second method involves filling the tank with a liquid, for example, a urethane, silicon, isocyanate, or "TEFLON" liquid, after the preform is dissolved; and then dumping the liquid out such that the internal surfaces of the tank are completely coated with liquid. The internally liquid-coated tank is then cured.

Additionally, with respect to the fabrication of non-cylindrical fuel tanks 11 three-dimensional braiding techniques using a mandrel can be employed without the use of core or fugitive materials on which to construct the tanks 11. Braiding techniques permit the tank 11 to retain its shape while resisting the internal pressure forces acting thereon, such is illustrated for example in FIG. 7.

One such technique for braiding without a core is the use of a braided pre-form which has a thermoplastic resin previously incorporated therein. Such pre-resinified, pre-braided structures can then be heated up and inflated to its final shape with a gas or liquid. The orientation and length of the fibers in the braided pre-form determine its ultimate shape.

Alternatively, a gas material can be injected into the interior of the resinified pre-form after it is placed within a female cavity of a mold, e.g., a mold formed from sections, so that the injected gas operates to force the structure against the mold section into which ultimate shape tank 11 conforms. The heat can then be removed and the mold portions separated to result in the desired configuration.

The process used to attain functional rigidity of the tank is dependent on the matrix or resin material used. A thermosetting resin can be cured at room or elevated temperatures and a thermoplastic is final formed at elevated temperatures, then cooled.

The following nonlimiting example will further illustrate a storage tank constructed in accordance with the principles of the present invention.

EXAMPLE

First, a core was formed from a piece of one inch thick foam cut into a six inch by six inch square. The edges of the foam were rounded, using a one-half inch router bit, thereby creating a foam square with smooth semicircular edges having a one-half inch radius and two opposed five inch by five inch surfaces. Notches were cut at the center of two opposed curved edges to receive metal inserts. The metal inserts were made from a two inch long, one inch diameter piece of aluminum rod that was sawed in half longitudinally to create an insert with a semicircular cross-section. A longitudinal center hole was drilled through the metal inserts, and the holes were tapped to accept a 1/8 pipe. The metal inserts were then inserted into the notches so that their ends were flush with the surface of the curved edge.

Next, three plies of three ounce per square yard E-glass woven fabric were wrapped around the core, followed by three plies of twenty ounce E-glass woven fabric. The second set of plies of woven fabric was rotated ninety degrees with respect to first set of plies. The fabric covered foam core assembly was now ready to be stitched through the thickness. The stitches were made with a seventy pound tensile strength braided "KEVLAR" line in a grid pattern. The grid pattern had stitching along a first set of rows extending diagonally across the opposed surfaces. Stitches also extended along a second set of diagonal rows substantially perpendicular to the first set of rows. The stitches penetrated the fabric approximately every 0.125 inch, and the rows of stitches were separated by approximately 0.125 inches, thereby tying the two five inch by five inch surfaces together. The fabric was cut from around the tapped holes in the metal inserts and two 1/8 pipes were attached to the assembly. Epoxy resin was then squirted between the fabric and the foam, using a hypodermic needle. The resin was applied in this fashion to ensure the resin thoroughly saturated the fabric. The completed assembly was cured in one-half an hour and was allowed to post-cure for one week. Acetone was then used as a solvent to dissolve the foam core, thereby forming the tank interior.

A T-fitting with two Zerk fittings was connected to one of the two 1/8 pipes in the cured tank assembly. A 3,000 pounds per square inch ("psi") pressure gauge was attached to the opposite 1/8 pipe and was used to record pressure. Testing began by first filling the tank with grease through the Zerk fittings. When the tank pressure reached 600 psi, a small leak developed at one of the corners. The tank pressure was raised to 1,000 psi, and it took twenty-nine seconds for the pressure to drop from 1,000 psi to 500 psi. Pressure was again applied to the tank, and the internal fibers began to fail at approximately 1,300 psi. By increasing the number of stitches per square inch and/or by changing the type of fabric or material, it is believed that a tank can be fabricated in which an initial failure of the internal fibers will not occur until a pressure of 10,000 psi or more.

Figure 9:
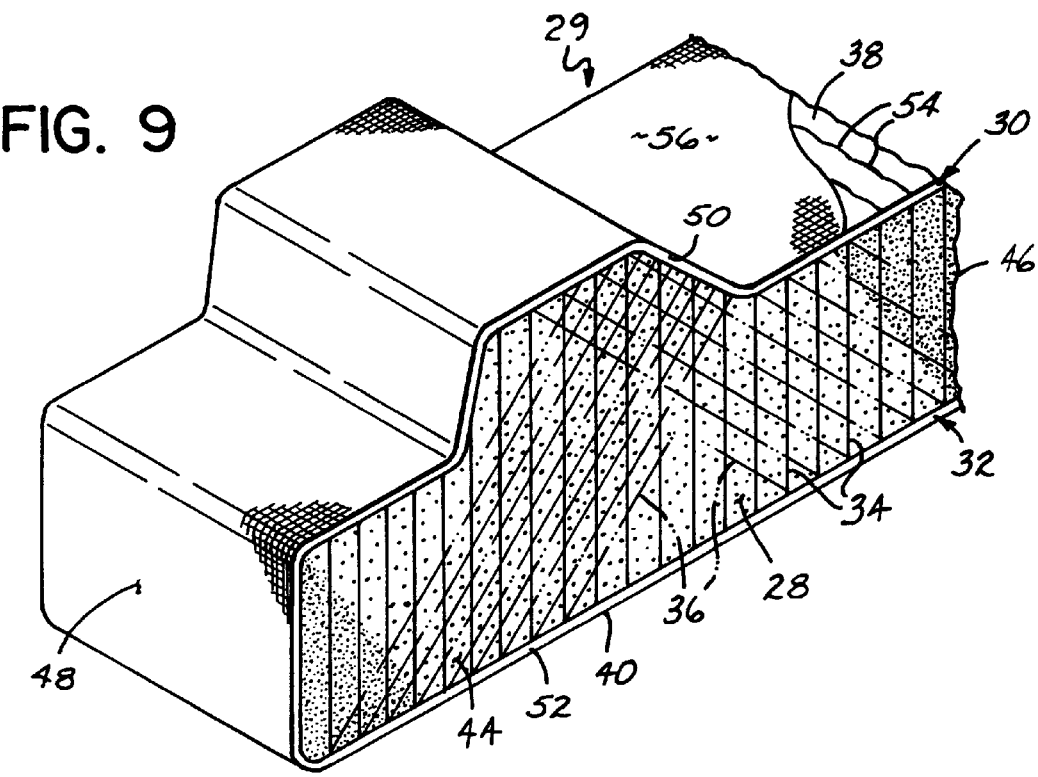
FIG. 9 is a fragmentary, cross-sectional, perspective view of an alternative embodiment of a reinforced composite structure in accordance with the principles of the present invention.

While manufacturing the tanks previously described, it was discovered that an intermediate structure provided significant alternative uses. More specifically, when the tank is manufactured around a captive core, prior to its removal, there is provided a very stiff, light weight reinforced composite structure. Referring to FIG. 9, the reinforced composite structure 29 is formed by two opposed skins or layers 30, 32 of fibrous composite material applied to a captive core 28. The core 28 may be made from clay, foam, honeycomb, metal, paper, plastic, rubber, wax, or wood. The foam core may be metal, ceramic, rubber, concrete, plastic, or a polymer material. Further, the honeycomb core may be made from paper, composite, metal, plastic, a polymer, or thermoplastic material. The layers 30,32 are substantially identical to the layer 15 of FIG. 8 and are made of the same composite materials as previously described with respect to the layer 15.

Continuous internal fibrous bundles 34 are identical to the previously described internal fibrous bundles 16 of FIG. 8. However, in FIG. 9, the fibrous bundles 34 extend in a direction generally perpendicular to the major surfaces of the layers 30, 32. Alternatively, the fibrous bundles may extend in a direction oblique to the major surfaces of the layers 30, 32 as shown in phantom by the oblique bundles 36. The bundles of fibers 34 are sewn or threaded in a repeating pattern over an exterior surface 38 of the layer 30, through the first layer 30, through the core 28, through the second layer 32 and over the exterior surface 40 of the second layer 32.

A side 44 or end 46 of the reinforced composite structure 29 may be left unfinished. Alternatively, the side and end surfaces may be finished with a close out or edge layer 48 that extends between the edges 50, 52 of the respective layers 30, 32. The fibrous composite layers 30, 32 and bundles 34 may be coagulated together using a matrix material, which in turn can be a thermoset or thermoplastic resin or a metal matrix as previously described. Further, exposed portions 54 of fibrous bundles 34 are crossed over or stitched through the fibrous composite layered material 30, 32 as described and can be covered with a protective layer or coating 56 that is identical to the protective coating 26 previously described.

The reinforced composite structure 29 is a sandwich construction that has the capability of being made to any desired geometry or shape to fit any desired space. The reinforced composite structure 29 is especially useful in the aircraft industry and can be used to make doors, panels, wings and structural members. In addition, the reinforced composite structure can be used in an automobile chassis, bridges, floor members for buildings, trailers or trucks and grating, etc. The composite structure 29 has the advantages of being very stiff, lightweight and capable of possessing greater strength and stiffness when compared to other composite structures. In addition, the reinforced composite structure 29 possesses increased damage tolerance and resistance to delamination.

While the invention has been set forth by a description of the preferred embodiment in considerable detail, it is not intended to restrict or in any way limit the claims to such detail. Additional advantages and modifications readily appear to those who are skilled in the art. For example, the preferred embodiment of the invention is a noncylindrical fuel tank for storing pressurized natural gas for powering a vehicle. As will be appreciated, the construction of the present invention may be used in the construction of tanks of any geometric shape including cylindrical tanks. Further, tanks constructed in accordance with the present invention may be used to store any gas under pressure, for example, oxygen for aircraft emergency supply tanks, air for emergency rescue and scuba tanks, nitrous oxide or other anesthetic in medical environments, a propellant gas for a gun or weapon, propane in a lighter weight, more portable container. In addition, tanks constructed in accordance with the present invention may be used for hydraulic accumulators, fire extinguisher, tankard trucks, gas storage tanks for industrial or commercial, etc.

The invention, therefore, in its broadest aspects, is not limited to the specific detail shown and described. Consequently, departures may be made from the details described herein without departing from the spirit and scope of the claims which follow.

What is claimed is:

1. A stiff reinforced composite structure comprising:
   a core;
   first and second layers of fibrous material, the first and second layers bounding respective first and second opposed surfaces of the core and having respective exterior surfaces; and a first set of continuous, fibrous bundles extending in a repeating pattern
over the exterior surface of the first layer,
through the first layer,
through the core;
through the second layer,
over the exterior surface of the second layer; and a matrix material joining the first and second layers of fibrous material, the fibrous bundles and the core into a stiff reinforced composite structure.

2. The reinforced composite structure of claim 1 wherein the core is a material selected from the group consisting of clay, foam, a honeycomb, metal, paper, plastics rubber, wax and wood.

3. The reinforced composite structure of claim 1 wherein the layers are a material selected from the group consisting of a fibrous composite layered material, a woven fabric, a unidirectionally oriented fiber arid a randomly oriented fiber.

4. The reinforced composite structure of claim 1 wherein the fibrous bundles are made from a material selected from the group consisting of glass fibers, quartz fibers, graphite fibers, organic fibers and steel fibers.

5. The reinforced composite structure of claim 4 wherein the steel fibers are joined together by a lower melting point metal matrix.

6. The reinforced composite structure of claim 1 wherein the matrix material joins the first and second layers and portions of the fibrous bundles extending over the exterior surfaces of the layers.

7. The reinforced composite structure of claim 6 wherein the matrix material is selected from the group consisting of a thermoset resinous matrix material and a thermoplastic resinous matrix material.

8. The reinforced composite structure of claim 1 further comprising a protective layer covering respective exterior surfaces of the first and second layers and portions of the fibrous bundles extending over the respective exterior surfaces.

9. The reinforced composite structure of claim 8 wherein the protective layer is made from a material selected from the group consisting of a resinous coating, a protective film and a metal.

10. The reinforced composite structure of claim 1 further comprising an edge layer extending between edges of the first and second layers.

11. The reinforced composite structure of claim 1 wherein the fibrous bundles extend between the first and second layers in a direction substantially perpendicular to the first and second layers.

12. The reinforced composite structure of claim 1 wherein the fibrous bundles extend between the first and second layers in a direction oblique to the first and the second layers.

13. A method of making a stiff reinforced composite structure comprising the steps of:

applying first and second layers of fibrous material over respective first and second opposed surfaces of a core material; and sewing a set of continuous, fibrous bundles in a repeating pattern
over the exterior surface of the first layer,
through the first layer,
through the core material,
through the second layer,
over the exterior surface of the second layer, and coagulating the first and second layers of fibrous material and the fibrous bundles with a matrix material; and curing the matrix material, thereby joining the fibrous material, the fibrous bundles, the core and the matrix material into a stiff reinforced composite structure.

14. The method of claim 13 wherein the method further comprises sewing the fibrous bundles in a generally perpendicular direction with respect to the first and second layers.

15. The method of claim 13 wherein the method further comprises sewing the fibrous bundles in an oblique direction with respect to the first and second layers.

16. The method of claim 13 wherein the method further comprises applying an edge layer extending between edges of the first and second layers.

* * * * *